(12) United States Patent
Hung et al.

(10) Patent No.: US 12,379,257 B2
(45) Date of Patent: Aug. 5, 2025

(54) PHASE DETECTION TECHNIQUES FOR HALF-SHIELD PHASE-DETECT SENSORS

(71) Applicant: Advanced Micro Devices, Inc., Santa Clara, CA (US)

(72) Inventors: Wei-Chih Hung, Hsinchu (TW); Po-Min Wang, Hsinchu (TW); Yu-Huai Chen, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 522 days.

(21) Appl. No.: 17/853,796

(22) Filed: Jun. 29, 2022

(65) Prior Publication Data

US 2024/0003748 A1 Jan. 4, 2024

(51) Int. Cl.
*G01J 9/00* (2006.01)
*G02B 7/36* (2021.01)

(52) U.S. Cl.
CPC . *G01J 9/00* (2013.01); *G02B 7/36* (2013.01)

(58) Field of Classification Search
CPC .................................. G01J 9/00; G02B 7/36
See application file for complete search history.

(56) References Cited

U.S. PATENT DOCUMENTS

| | | | | |
|---|---|---|---|---|
| 9,118,828 | B2* | 8/2015 | Okazawa | H04N 23/673 |
| 10,939,058 | B2* | 3/2021 | Tanaka | H04N 25/531 |
| 11,343,436 | B2* | 5/2022 | Wang | H04N 25/704 |
| 11,616,927 | B2* | 3/2023 | Sakurabu | H04N 23/60 |
| | | | | 348/294 |
| 2013/0120609 | A1* | 5/2013 | Okazawa | H04N 25/704 |
| | | | | 348/223.1 |
| 2015/0055011 | A1* | 2/2015 | Aoki | H04N 25/703 |
| | | | | 348/353 |
| 2017/0090149 | A1* | 3/2017 | Galor Gluskin | H10F 39/8053 |
| 2020/0007799 | A1* | 1/2020 | Tanaka | H04N 25/671 |
| 2021/0203841 | A1* | 7/2021 | Miyatani | G02B 7/34 |
| 2021/0377479 | A1* | 12/2021 | Sakurabu | H04N 25/75 |
| 2021/0409587 | A1* | 12/2021 | Wang | H04N 23/73 |

OTHER PUBLICATIONS

Butler, R., "Exclusive: Fujifilm's Phase Detection System Explained", downloaded from https://www.dpreview.com/articles/2151234617/fujifilmpd, retrieved Jun. 29, 2022, Published Aug. 5, 2010, 3 pgs.

* cited by examiner

*Primary Examiner* — Hina F Ayub
(74) *Attorney, Agent, or Firm* — Volpe Koenig

(57) ABSTRACT

Techniques for performing phase detect operations are described. The techniques include obtaining first measurements with a set of half-shield phase-detect sensors; obtaining second measurements with a set of non-phase detect sensors that are not configured as phase-detect sensor; and determining a phase difference based on the first measurements and the second measurements.

20 Claims, 4 Drawing Sheets

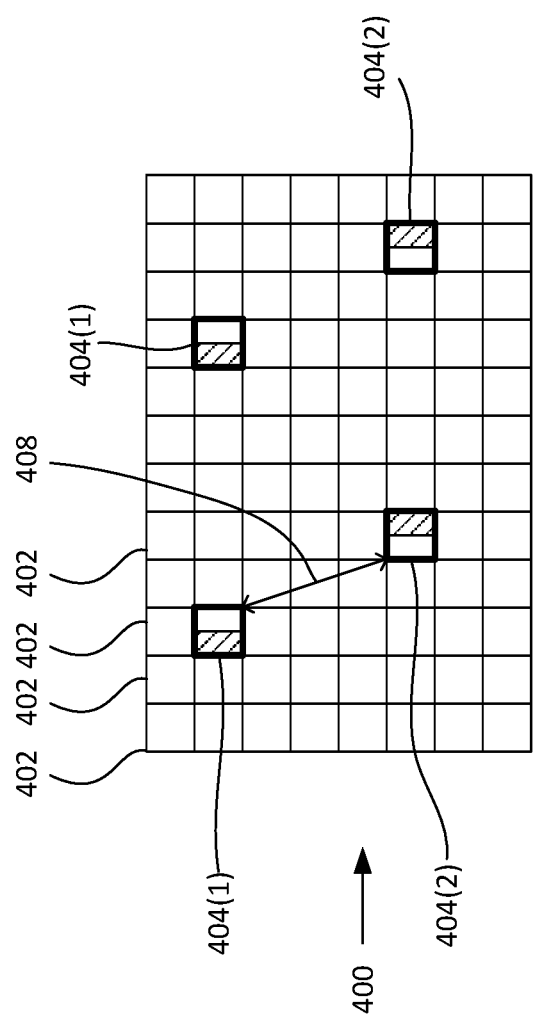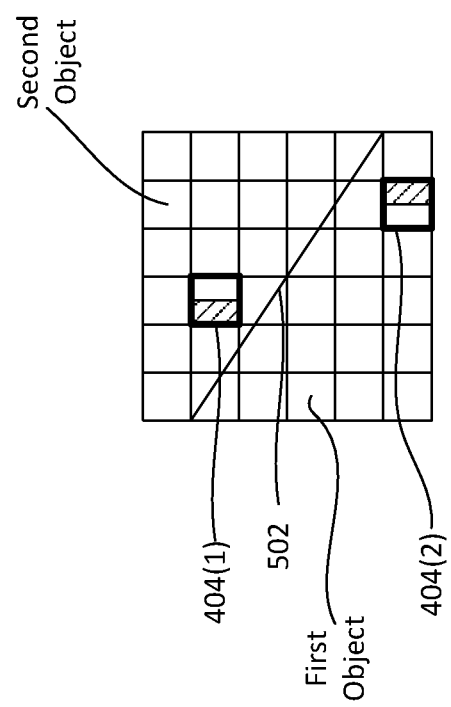

PHASE DETECTION TECHNIQUES FOR HALF-SHIELD PHASE-DETECT SENSORS

BACKGROUND

Cameras include phase detect sensors for various purposes such as autofocus. Improvements utilizing such techniques are frequently made.

BRIEF DESCRIPTION OF THE DRAWING

A more detailed understanding may be had from the following description, given by way of example in conjunction with the accompanying drawings wherein:

FIG. 4 illustrates a half-shield phase detect image sensor that is an example of the image sensor of FIG. 1;

FIG. 5 illustrates an example where a first direction phase-detect site and a second direction phase-detect site capture light from different objects;

DETAILED DESCRIPTION

Techniques for performing phase detect operations are described. The techniques include obtaining first measurements with a set of half-shield phase-detect sensors; obtaining second measurements with a set of non-phase detect sensors that are not configured as phase-detect sensor; and determining a phase difference based on the first measurements and the second measurements.

Figure 1:
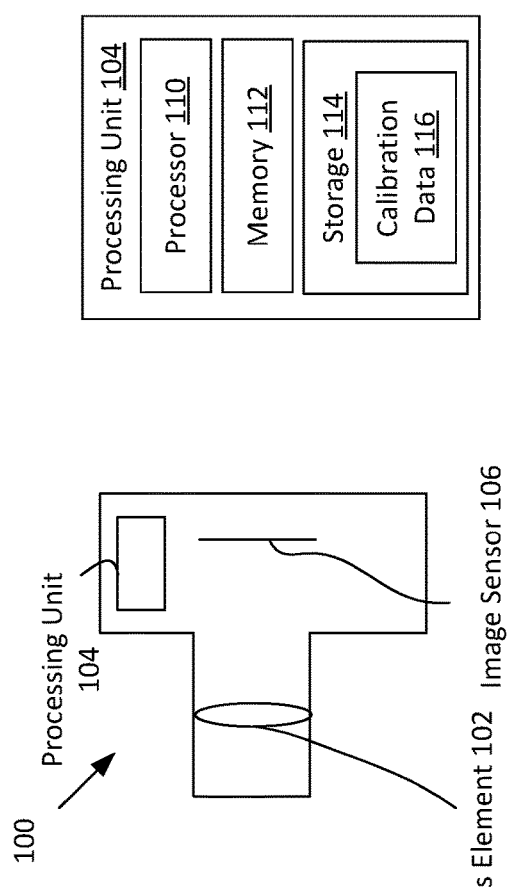
FIG. 1 illustrates a camera, according to an example.

FIG. 1 illustrates a camera 100, according to an example. The camera 100 is an example of a device that implements the techniques described herein. However, performance of the techniques described herein by any technically feasible device capable of performing such techniques is possible. In some examples, the camera 100 is included in another device such as a phone, a laptop or desktop computers, or any other device. In addition, although the camera 100 is depicted as having a particular shape, this shape is used for simplicity of explanation and is not intended to be limiting.

The camera 100 includes a lens element 102, a processing unit 104, and a half-shield phase-detect image sensor 106. The lens element 102 is part of a lens system and can be adjusted to adjust focus. For simplicity, the entirety of the lens system is not shown, and the lens element 102 is representative of a wide variety of lens types capable of focusing. The image sensor 106 includes sensor elements such as photosensitive sites and a color filter to capture light that travels through the lens element 102. The processing unit 104 includes circuitry that is configured to control the camera 100 (for example, performing auto-focusing for the lens element 102, controlling the camera, including the lens element 102 and image sensor 106, to capture images, and other operations), and to receive image data with the image sensor 106.

The processing unit 104 includes a processor 110, a memory 112, and a storage 114. The memory 112 includes volatile memory elements that are configured to store working data and instructions for the processor 110. The storage 114 includes non-volatile memory elements that are configured to store data in a non-volatile manner. The camera 100, including the processing unit 104, can include elements not illustrated in FIG. 1 or described herein.

Figure 2:
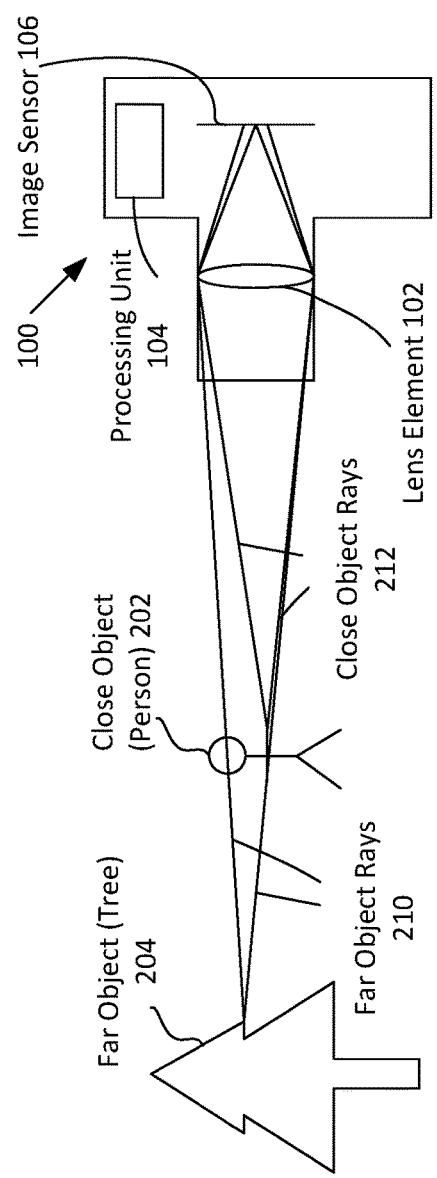
FIG. 2 is a diagram that illustrates a camera in operation, according to an example.

FIG. 2 is a diagram that illustrates the camera 100 in operation, according to an example. The camera 100 is pointed at a far object 204 (a tree in the example shown) and a close object 202 (a person in the example shown). The position of the lens element 102 controls which object is in focus. A lens bends light rays emitted or reflected from an object such that rays from the same point on the object fall on approximately the same location on the image sensor 106 (light rays in focus converge to within a threshold distance from each other). In general, lenses are unable to focus light rays from objects at all distances, and are adjusted to focus at different focal distances. While such adjustment varies by lens configuration, in general, focusing involves changing the position of one or more elements of the lens. In FIG. 2, the lens element 102 is in a position that causes the close object 202 to be in focus, but the far object 204 is not in focus. As can be seen, the close object rays 212 converge to a point on the image sensor 106, but the far object rays 210 do not converge to a point on the image sensor 106. It can be seen that the rays from the same point on an object are incident on different portions of the lens element 102. Again, a goal of a lens is to cause light rays from an object that are incident on a variety of locations of the lens itself to converge to a point.

Figure 3:
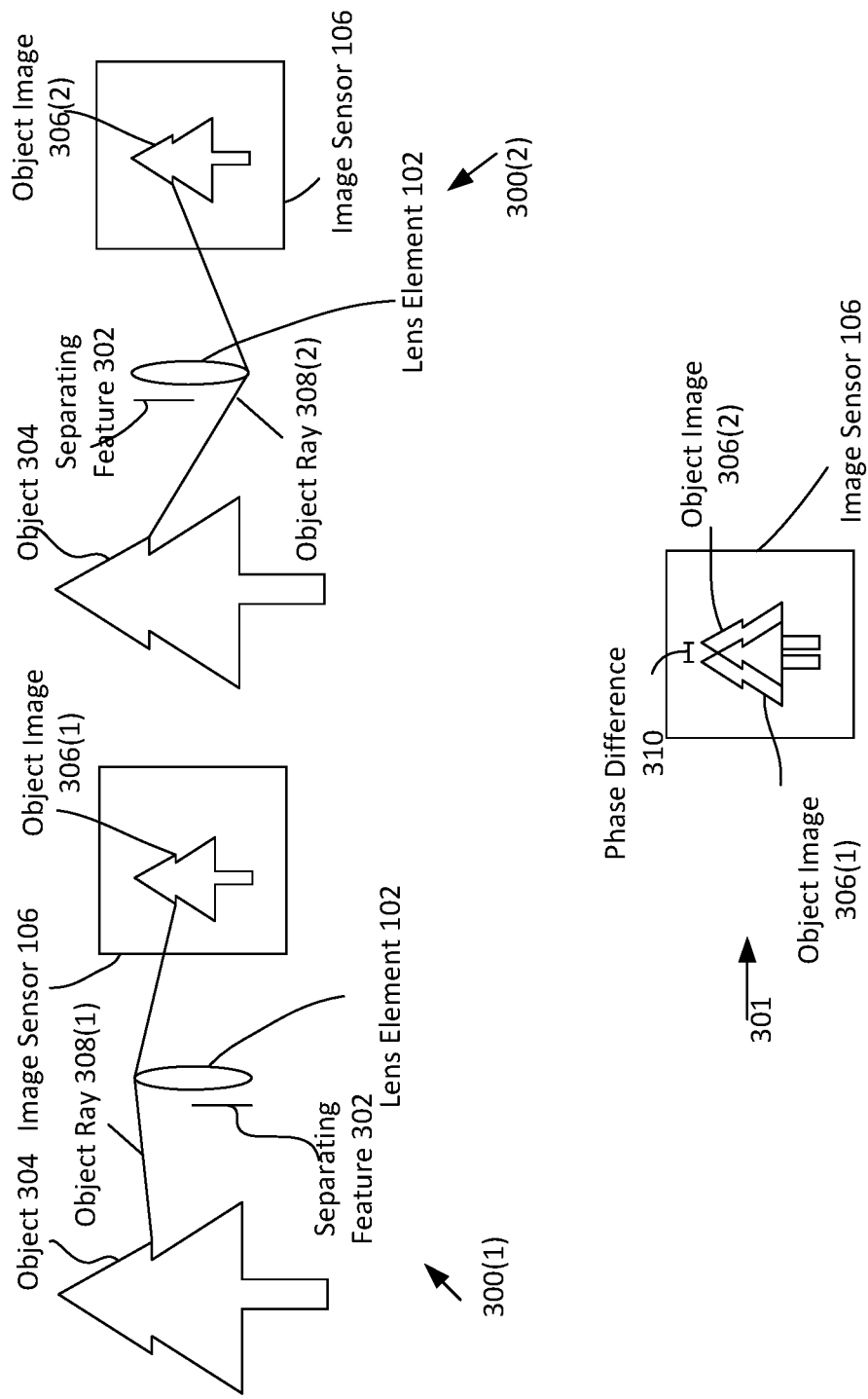
FIG. 3 is an illustration of a phase detect operation.

Phase-detect autofocus is an autofocus technique whereby a camera automatically focuses on a particular object based on the phase difference associated with that object. The phase difference represents a difference in position of images obtained for different collections of light rays that pass through the lens. More specifically, a separating feature 302 is used to bias the light rays captured through the lens element 102 so that only light rays from a portion of the lens element 102 are captured by a phase detect site. With separating features 302 positioned in different locations, different sets of light rays are captured. Light rays incident on a particular side of the lens element 102 are biased in a certain direction unless the object is in focus, in which case all light rays converge. Thus, by separating out light rays from one side to form a first image, separating out light rays from another side to form a second image, and then comparing the first and second image, it can be determined whether features of an image are in focus. Specifically, if there is a positional difference between the first image and the second image, then the features are not in focus, and if there is minimal positional difference (e.g., difference below a threshold), then the features are considered to be in focus. It should be understood that FIGS. 2 and 3 are conceptual illustrations and that the positions, shapes, and other aspects of elements illustrated should not be taken as being limiting. For example, although the separating feature 302 is shown in a particular location, it should be understood that any configuration of separating feature 302 is contemplated by the present disclosure. In particular, an image sensor with half-shield phase detect autofocus sites having separating features 302 integrated within is contemplated by the present disclosure.

In the example of FIG. 3, a first imaging configuration 300(1) illustrates a blocking feature 302 in a first position (e.g., on the bottom). In this configuration, the object ray 308(1) generates a first object image 306(1). Regarding the second image configuration 300(2), a blocking feature 302 is in a second position (e.g., at the top). In this configuration, the object ray 308(2) generates a second object image

306(2). A combined image 301 illustrates a substantial phase difference 310 (e.g., a phase difference above a threshold) between the object image 306(1) and the object image 306(2). Thus, the object represented is not in focus. A minimal phase difference 310 (e.g., a phase difference below a threshold) would indicate the object being in focus.

Some aspects of FIG. 3 are simplified for explanation. For example, it should be understood that a small number of light rays are illustrated for ease of illustration, but a lens focuses a very large number of light rays incident on a wide area of the lens. Also, although only a single object is shown in the various object images 306, an image captured by an image sensor 106 can include many objects. In addition, because objects can be at different distances from the camera, different objects may exhibit different phase differences 310. In various examples, the camera 100 includes multiple phase detect sites, each of which is configured to receive a portion of light rays as reduced by a blocking feature. In some such examples, the camera 100 measures phase difference by comparing images formed from different sets of phase detect sites, where each set includes phase detect sites having blocking features 302 blocking light rays from the same direction. In an example, the camera 100 generates a first image from a first set of phase detect sites having blocking features 302 that block light rays from a first direction and generates a second image from a second set of phase detect sites having blocking features 302 that block light rays from a second direction. In some places in this document, these images are called "phase-biased images." The camera 100 compares the offset (i.e., difference in position) for the first image and the second image to determine the phase difference 310 for those images. In some examples, the camera 100 performs such operations for multiple subdivisions of the image sensor 106, to determine phase difference for different portions of the image sensor 106. More specifically, the camera 100 groups together phase detect sites in the same area of the image sensor 106 (e.g., a square or rectangular "tile") and forms phase-biased images from such groups. This allows the camera 100 to have different phase detect measurements at different parts of the image sensor 106 and thus to determine focus for different parts of the image. In some examples, the blocking features are optical barriers that prevent a portion of light rays incident on one side of a lens element 102 from arriving at a phase detect site. In some examples, these optical barriers are adjacent to the phase detect sites. In such examples, the optical barriers are in a physical location that blocks light rays coming from a particular direction.

A phase detect operation is now described. In the course of capturing an image, the camera 100 obtains optical signals at multiple phase detection sites. Each phase detection site is an optical receptor that receives optical signals (e.g., light intensities). Further, each phase detection site is located at and thus corresponds to a particular site in an image captured by an image sensor 106. In some examples, the "phase difference" for different pairs of sites indicates how in focus the image is at a location corresponding to that pair of sites. A phase difference relates to the offset that occurs between images generated by different types of phase detection sites. In such examples, each of multiple pairs of phase detect sites are located close together and thus corresponds to a particular location on the image sensor 106 and the image captured. Also in such examples, each pair of sites includes a first phase detect site with a separating feature that passes light rays biased in a first direction and a second phase detect site with a separating feature that passes light rays biased in a second direction. Thus each pair of phase detect sites captures different sets of light rays, each of which is phase-biased in a different manner. The phase difference associated with such a pair of sites is associated with a location on the sensor 106 and a captured image. In some examples, the camera 100 captures a first phase-biased image with a first set of phase detect sites, each of which has a separating feature configured to pass light rays biased in a first direction and captures a second phase-biased image with a second set of phase detect sites, each of which has a separating feature configured to pass light rays biased in a second direction. The camera 100 then compares the offset between the images to generate a phase difference. The location of a phase difference is termed a "phase difference location." The measurement or phase difference value is sometimes termed a "phase difference measurement." Each phase difference measurement is associated with a phase difference location.

FIG. 4 illustrates an image sensor 400 that is an example of the image sensor 106 of FIG. 1. The image sensor 400 includes a plurality of non-phase detect sites 402 and a plurality of half-shield phase detect sites 404. Each non-phase detect site 402 is a photoreceptive site that is capable of sensing a light intensity by converting a light signal into an electrical signal. The processor 110 controls the camera 100 to capture an image (e.g., with an electronic or mechanical shutter) by obtaining light intensity measurements. In some examples, a color filter such as a Bayer filter is overlaid over the image sensor 400 to specialize each of the non-phase detect sites 402 for a particular color such as red, green, or blue.

The half-shield phase detect sites 404 include first direction half-shield phase detect sites 404(1) and second direction half-shield phase detect sites 404(2) (collectively referred to as "half-shield phase detect sites 404" or just "phase detect sites 404" here). The first direction half-shield phase detect sites 404(1) have a separating feature that passes light rays from a first direction and not a second direction, and the second direction half-shield phase detect sites 404(2) have a separating feature that passes light rays from a second direction that is different than the first direction, and does not pass light rays from the first direction. As illustrated in FIG. 4, in some examples, the first direction is on the left and the second direction is on the right, but any other set of directions is possible as well.

The processor 110 obtains intensity measurements at each of the phase detect sites 404. The processor 110 groups together intensity measurements from phase detect sites 404 having the same blocking direction, within tiles of the image sensor 400 (such as rectangular or square tiles) to form images. Thus processor 110 obtains multiple images for each such tile. The processor 110 obtains a phase difference for each such tile by determining the positional offset of these two images as shown, for example, in FIG. 3. In sum, the processor 110 generates images from different sets of phase detect sites 404. Each image is generated from phase detect sites 404 having the same bias direction, and one image is derived from phase detect sites 404 having a different bias direction than another image.

As can be seen, there is a gap 408 between the first direction phase-detect sites 404(1) and the second direction phase-detect sites 404(2). Thus, it is possible that the images obtained with the different direction sensors will not correlate correctly. FIG. 5 illustrates an example where a first direction phase-detect site 404(1) and a second direction phase-detect site 404(2) capture light from different objects. An object boundary 502 illustrates that it is possible for a first direction phase-detect site 404(1) to capture light from a different object than a second direction phase-detect site 404(2). Thus it is possible for the image captured with a first set of phase-detect sites 404 to not correlate well with an image captured with a second set of phase-detect sites 404, which could lead to an inaccurate generation of a phase difference measurement. In an extreme case, the image captured is a high frequency image where most of a first object is captured by a plurality of first direction phase-detect sites 404(1) and most of a second object is captured by a plurality of second direction phase-detect sites 404(2). In such instance, the images captured with different types of phase-detect sites 404 will not correlate at all, and the offset obtained by the processor 110 will not accurately reflect the actual degree of focus obtained by the camera 100.

For the above reasons, techniques are provided herein for performing phase-detect sensing using a set of phase-detect sites 404 and a set of non-phase detect sites 402. More specifically, instead of generating images from two sets of phase-detect sites 404 and generating a phase difference from those two images, the processor 110 generates a first image from a set of phase-detect sites 404 and a second image from non-phase detect sites 402. Because the image from the phase-detect sites 404 is biased, that image is still biased with respect to an image generated from a set of non-phase detect sites 402, which do not have a separating feature 302 and are thus not biased. The amount of offset between the non-phase detect sites 402 and the phase-detect sites 404 will not be as great as the amount of offset between two sets of phase-detect sites 404 with different direction separating features 302, but the offset will be present and will allow for determination of an offset. Further, the fact that non-phase detect sites 402 are used means that the locations of the measurements taken for generation of the offset can be much closer together.

Figure 6:
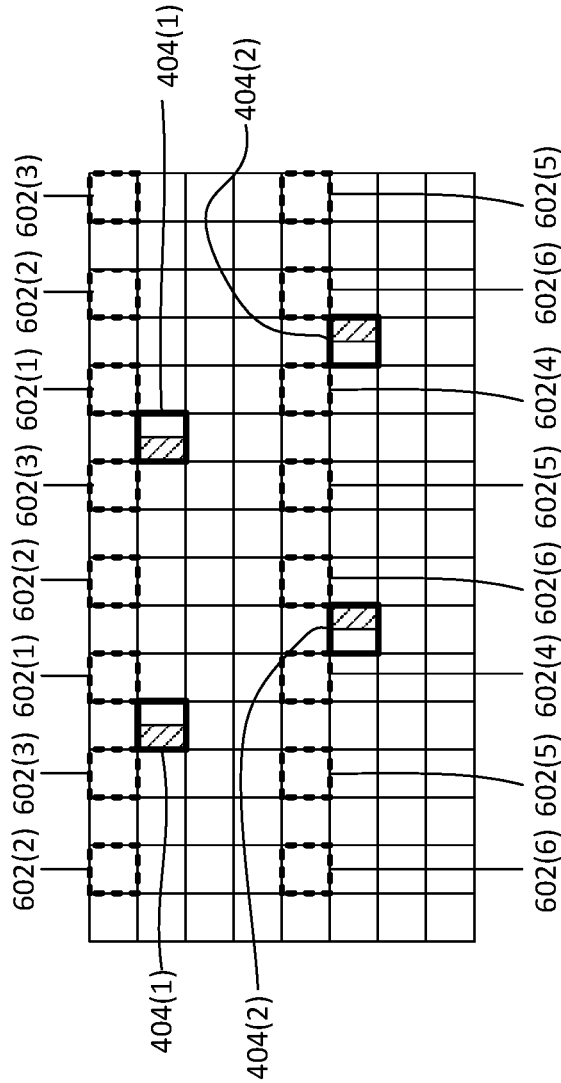
FIG. 6 illustrates a portion of an image sensor illustrating comparisons between phase-detect sites and non-phase detect sites.

In FIG. 6, several non-phase detect sites 402 in two rows are highlighted with dotted lines. These non-phase detect sites are labeled with reference number 602. In some examples, the non-phase detect sites 602 form groups depending on their position relative to a nearby phase-detect site. In the example shown, the non-phase detect sites directly above and to the right of the left-biased phase detect sites 404(1) have reference number 602(1) and are part of a first set. Also in this example, the non-phase detect sites directly above and three to the right of the left-biased phase detect sites 404(1) have reference number 602(2) and are part of a second set. Similarly, the non-phase detect sites directly above and five to the right of the left-biased phase detect sites 404(3) have reference number 602(3) and are part of a third set. Similarly, for the right-biased phase detect sites 404(2), non-phase detect sites above and one to the left are part of a fourth set and have reference numbers 602(4), non-phase detect sites above and three to the left are part of a fifth set and have reference numbers 602(5), and non-phase detect sites above and five to the left are part of a sixth set and have reference numbers 602(6).

In some examples, the processor 110 generates a phase difference measurement in the following manner. The processor 110 generates an image from a set of phase detect sites 404 having the same biasing direction (e.g., a set of left-biased sites 404(1) or a set of right-biased sites 404(2)). The processor 110 also generates an image from a set of non-phase detect sites having the same relative position to the phase detect sites 404. For example, the processor 110 generates a first image from a collection of left-blocked phase detect sites 404(1) and generates a second image from a collection of non-phase detect sites 602(1). The processor 110 determines the offset between the first image and the second image, and sets the phase difference based on the offset.

In some examples, the processor 110 determines the offset between two images in the following manner. The processor 110 displaces one of the images relative to each other multiple times, iteratively, to find the displacement that exhibits the maximum correlation between the two images. The amount of displacement with the maximum correlation is considered to indicate the phase difference for those two images. For example, the amount by which one image is moved to achieve maximum correlation indicates the phase difference. In some examples, correlation means similarity between two images. The processor 110 determines this correlation in any technically feasible manner. In some examples, the processor 110 determines the sum of absolute differences between the two images (with one displaced). The sum of absolute differences for two images is the total of the absolute values of the differences between corresponding pixels of each image. In an example, the absolute value of the intensity difference of the top-left most pixel is added to the absolute value of the intensity difference of the pixel to the right of that, and the resulting sum is added to the absolute value of the intensity difference of the pixel to the right of that, and so on, for each pixel of the images.

It is possible for the processor 110 to perform multiple image comparisons of the type just described and to combine the results of such comparisons to obtain a phase offset. In an example, the processor 110 obtains a first image for a set of phase detect sites 404 (such as a set of left-biased phase-detect sites 404(1) or a set of right-blocked phase-detect sites) and obtains several other images, each with a different set of non-phase detect sites 602. For each such other image, the non-phase detect sites 602 from which the image is generated are at the same distance from a phase detect site 404. In an example, the processor 110 generates a first image with non-phase detect sites 602(1), generates a second image with non-phase detect sites 602(2), and generates a third image with non-phase detect sites 602(3). The processor 110 compares the image generated using the phase detect sites 404 with each of the images generated with a particular set of non-phase detect sites 602 to obtain a correlation amount and an offset for each such comparison. The processor 110 then selects the offset for the comparison with the highest correlation. In other words, the processor 110 compares images generated with different sets of non-phase detect sites 602 to the image generated with a set of phase detect sites 404 and selects the comparison with the highest correlation as the comparison that "best" characterizes the phase offset. Then, the processor 110 determines the phase offset based on that comparison.

In some examples, within a particular tile of the image sensor 106, the processor 110 performs the above steps both for phase detect sites 404 biased one way (e.g., left-biased phase detect sites 404(1)), and phase detect sites 404 biased another way (e.g., right-biased phase-detect sites 404(2)), generating the comparisons between each set and multiple sets of non-phase detect sites 602 as described above, to obtain correlation and offset data for each such comparison. Then, the processor 110 selects, as the offset for the tile, the offset associated with the highest correlation. Thus, the processor 110 selects from all comparisons for a tile, involving all types of phase detect sites 404 (e.g., left-biased and right-biased sites). In sum, the processor 110 compares images received with the phase detect sites 404 to images received via different sets of the non-phase detect sites 602 and selects the comparison with the highest correlation. The processor 110 obtains the offset corresponding to that comparison and sets, as the phase difference for that tile, the phase difference corresponding to that offset.

The camera 100 uses this phase difference in any technically feasible manner, such as by performing an autofocus operation. For example, the camera 100 determines which tile will determine autofocus and then adjusts the lens to focus correctly based on the phase difference. For example, by knowing the phase difference, the camera 100 is able to adjust the lens position by an amount that is based on that phase difference. It is possible for the camera 100 to perform the above comparison operation and the above operation to determine phase difference for each of multiple tiles 106 of an image sensor and to select one such tile for autofocusing or other operations based on automatic or manual techniques.

In some examples, in performing a comparison between a set of phase-detect sites 404 and a set of non-phase detect sites 602, the processor 110 adjusts the intensities received with the non-phase detect sites 602 down or adjusts the intensities received with the phase-detect sites 404 up. This adjustment is to compensate for the fact that the phase-detect sites 404 are partially blocked and thus receive less light than the non-phase detect sites 602. In an example, without an adjustment, the light intensities read with the phase detect sites 404 would be smaller than the light intensities read with the non-phase detect sites 602. Thus, an operation to compare the images generated with the phase detect sites 404 and the non-phase detect sites 602 might not necessarily be successful. For example, a sum of absolute differences operation would record very large differences between pixels and thus could result in an erroneous determination of phase offset. To adjust for this difference in recorded intensities, the processor 110 adjusts either or both of the intensities measured with the non-phase detect sites 602 or the phase detect sites 404, so that these intensities are more similar. In some examples, a calibration step, performed at manufacture time, device startup time, or another time, records the light intensities received with both types of sites, given a known image (e.g., a solid white image with a uniform light intensity). The calibration system compares the intensities measured with the non-phase detect sites 602 to the intensities measured with the phase detect sites and stores calibration information that indicates how to adjust the intensities to be more similar.

Figure 7:
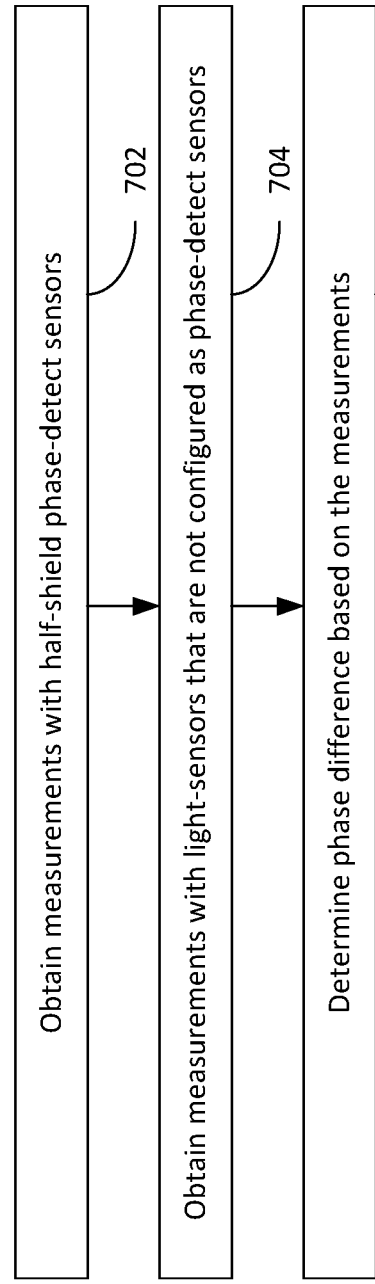
FIG. 7 is a flow diagram of a method for performing a phase detect operation, according to an example.

FIG. 7 is a flow diagram of a method 700 for performing a phase detect operation, according to an example. Although described with respect to the system of FIGS. 1-6, those of skill in the art will understand that any system configured to perform the steps of the method 700 in any technically feasible order falls within the scope of the present disclosure.

At step 702, the processor 110 of a camera 100 obtains measurements with half-shield phase detects sites, such as the phase-detect sites 404 of an image sensor 106. The measurements include light intensity measurements for light rays biased by a biasing mechanism configured for phase-detect sensing.

At step 704, the processor 110 obtains measurements with non-phase detect sites 602 that are not configured for phase-detect sensing. Being not configured for phase-detect sensing means that the non-phase detect sites 602 do not include and are not affected by a biasing mechanism that biases the light rays as described elsewhere herein. In some examples, the processor 110 obtains measurements for multiple sets of such non-phase detect sites 602 as described elsewhere herein. In some examples, the measurements of step 702 and 704 are taken for multiple tiles of an image sensor 106. In some examples, multiple sets of measurements are taken from non-phase detect sites 602 for each set of measurements taken from a set of phase-detect sites 404.

At step 706, the processor 110 obtains a phase difference based on the measurements obtained in step 702 and 704. In some examples, the processor 110 determines an offset between the image generated with the set of non-phase detect sites 602 and the image generated with the phase-detect sites 404. In some examples, this offset is obtained by determining the distance between objects in the two images or by determining the offset with the greatest correlation. In some examples, the processor 110 performs this operation for multiple sets of non-phase detect sites 602 as described above, and selects the offset for the set of non-phase detect sites 602 that best correlates with the image taken with the phase-detect sites.

In some examples, the camera 100 utilizes the phase difference measurements to perform an autofocus operation by adjusting the lens position to minimize the phase difference such that an object is in focus.

The processing unit 104 represents hardware circuitry configured to perform the operations described herein. The processor 110 is a programmable processor, a fixed-function processor, or a combination thereof. The lens element 102 is an optical element having a shape and composition configured to focus light rays onto the image sensor 106. The image sensor 106 is a combination of hardware circuitry, optical elements, and other elements that capture light and provide captured images to the processor 110. The hardware circuitry includes digital, analogue, and/or a combination thereof.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
obtaining first measurements with a set of half-shield phase-detect sites, wherein each half-shield phase-detect site includes a blocking feature configured to capture light rays from a first direction and block light rays from a second direction;
generating a first image from the first measurements;
obtaining second measurements with a set of non-phase detect sites configured to capture light rays from both the first direction and the second direction;
generating a second image from the second measurements;
determining a phase difference comprising an offset between the first image and the second image; and
performing an autofocus operation based on the phase difference.

2. The method of claim 1, wherein the first measurements comprise a first set of light intensities.

3. The method of claim 1, wherein the second measurements comprise a second set of light intensities.

4. The method of claim 1, wherein determining the phase difference comprises comparing the first measurements to different subsets of the second measurements to generate a set of comparison information.

5. The method of claim 4, wherein the set of comparison information includes a correlation and an offset.

6. The method of claim 5, wherein each different subset corresponds to a different set of non-phase detect sensors.

7. The method of claim 6, wherein each different set of non-phase detect sensors is at the same distance from a corresponding phase-detect sensor.

8. The method of claim 4, further comprising selecting, as the phase difference, a phase difference corresponding to a subset of the second measurements that best correlates with the first measurements.

9. The method of claim 1, further comprising adjusting either or both of the first measurements and the second measurements to account for differences in light received.

10. A system comprising:
a set of half-shield phase-detect sites, wherein each half-shield phase-detect site includes a blocking feature configured to capture light rays from a first direction and block light rays from a second direction;
a set of non-phase detect sites configured to capture light rays from both the first direction and the second direction; and
a processor configured to:
obtain first measurements based on the light rays from the first direction with the set of half-shield phase-detect sites;
generate a first image from the first measurements;
obtain second measurements based on the light rays from the first direction and the second direction with the set of non-phase detect sites;
generate a second image from the second measurements;
determine a phase difference based on the first measurements and the second measurements, wherein the phase difference comprises an offset between the first image and the second image; and
perform an autofocus operation based on the phase difference.

11. The system of claim 10, wherein the first measurements comprise a first set of light intensities.

12. The system of claim 10, wherein the second measurements comprise a second set of light intensities.

13. The system of claim 10, wherein determining the phase difference comprises comparing the first measurements to different subsets of the second measurements to generate a set of comparison information.

14. The system of claim 13, wherein the set of comparison information includes a correlation and an offset.

15. The system of claim 14, wherein each different subset corresponds to a different set of non-phase detect sensors.

16. The system of claim 15, wherein each different set of non-phase detect sensors is at the same distance from a corresponding phase-detect sensor.

17. The system of claim 13, wherein the processor is further configured to select, as the phase difference, a phase difference corresponding to a subset of the second measurements that best correlates with the first measurements.

18. The system of claim 10, wherein the processor is further configured to adjust either or both of the first measurements and the second measurements to account for differences in light received.

19. A non-transitory computer-readable medium storing instructions that, when executed by a processor, cause the processor to perform operations comprising:
obtaining first measurements with a set of half-shield phase-detect sites, wherein each half-shield phase-detect site includes a blocking feature configured to capture light rays from a first direction and block light rays from a second direction;
generating a first image from the first measurements;
obtaining second measurements with a set of non-phase detect sites configured to capture light rays for the second measurements from both the first direction and the second direction;
generating a second image from the second measurements;
determining a phase difference based on the first measurements and the second measurements, wherein the phase difference comprises an offset between the first image and the second image; and
performing an autofocus operation based on the phase difference.

20. The non-transitory computer-readable medium of claim 19, wherein the first measurements comprise a first set of light intensities.

* * * * *